United States Patent [19]

Malaval

[11] 4,221,637
[45] * Sep. 9, 1980

[54] LIQUID ABSORBENT SAFETY ROD FOR A NUCLEAR REACTOR

[75] Inventor: Claude Malaval, Antony, France

[73] Assignee: Groupement Atomique Alsacienne Atlantique, Le Plessis Robinson, France

[ * ] Notice: The portion of the term of this patent subsequent to Oct. 8, 1991, has been disclaimed.

[21] Appl. No.: 700,928

[22] Filed: Jun. 29, 1976

Related U.S. Application Data

[63] Continuation of Ser. No. 636,495, Dec. 1, 1975, abandoned, which is a continuation of Ser. No. 367,023, Jun. 4, 1973, abandoned.

[30] Foreign Application Priority Data

Jun. 2, 1972 [FR] France .................................. 72.19987

[51] Int. Cl.² .............................................. G21C 7/16
[52] U.S. Cl. .............................. 176/86 L; 176/DIG. 5
[58] Field of Search ............. 176/86 L, 86 R, DIG. 5

[56] References Cited

U.S. PATENT DOCUMENTS

| | | | |
|---|---|---|---|
| 2,987,455 | 6/1961 | Huston et al. ................. | 176/DIG. 5 |
| 2,990,353 | 6/1961 | Howard et al. ..................... | 176/86 L |
| 3,498,881 | 3/1970 | Siddall .............................. | 176/86 L |
| 3,507,748 | 4/1970 | Fenech et al. ..................... | 176/86 L |
| 3,773,619 | 11/1973 | Harrington et al. ............... | 176/86 L |

Primary Examiner—Harvey E. Behrend
Attorney, Agent, or Firm—Sughrue, Rothwell, Mion, Zinn and Macpeak

[57] ABSTRACT

A liquid absorbent safety rod for a nuclear reactor comprising a reservoir, the upper compartment of which is filled with liquid absorbent under gas pressure communicates with a lower compartment situated in the core of the reactor the lower compartment being filled with gas under pressure by way of a disconnectable hollow rod. By varying the gas pressure in the lower compartment, the quantity of absorbent descending into this compartment may be varied. When the hollow rod is disconnected from the reservoir, all the liquid absorbent falls into the lower compartment.

10 Claims, 6 Drawing Figures

U.S. Patent  Sep. 9, 1980  Sheet 1 of 2  4,221,637

LIQUID ABSORBENT SAFETY ROD FOR A NUCLEAR REACTOR

This is a continuation of application Ser. No. 636,495, filed Dec. 1, 1975, now abandoned which is a continuation of Ser. No. 367,023, filed June 4, 1973, now abandoned.

BACKGROUND OF THE INVENTION

1. Field of the Invention

The present invention relates to a safety and control device designed to lower the reactivity of a nuclear reactor by either the slow or extremely rapid introduction of a liquid absorbent into a space located in the core of the reactor or by slow introduction therein.

2. Prior Art

The devices for arresting a reactor by introducing a liquid absorbent have the advantage over the conventional devices such as control rods in that they are able to function even in the event of serious accidents in the reactor.

Certain of the known liquid absorbent arresting devices operate by injecting the absorbent directly into the liquid refrigerant or into the moderator. It is then very difficult to extract the absorbent from the moderator and absorbent separation devices are very cumbersome and costly.

In the case of other known devices, the absorbent circulates in the pipes crossing right through the reactor. The absorbent is kept ready outside the core of the reactor by means of gas pressure and the supply of absorbent is stored outside the reactor in a drum governed by gas pressure.

These devices have the disadvantage of requiring numerous gate valves to get the liquid moving. Furthermore, the pipes filled with liquid are relatively long which produces charging losses and sluggishness of the flow movement of the liquid. This prejudices a rapid response and calls for very high pressures. In addition, this sluggishness has a detrimental effect at the end of the flow course thus necessitating the use of damping devices to check the flow of liquid.

SUMMARY OF THE INVENTION

The object of the present invention is to obviate the above disadvantages and to provide a liquid absorbent safety device, which only uses a quantity of liquid corresponding to a liquid column the height of the core. This column of liquid has a low inertia and may be rapidly set in motion and arrested without requiring a complicated checking device.

The liquid absorbent safety rod for a nuclear reactor according to the invention consists of a cylindrical reservoir comprising two superposed, communicating compartments. The upper compartment situated in the reactor above the core is filled with liquid absorbent surmounted by a gas under pressure $P_1$. The lower compartment situated in the core is filled with gas at a pressure $P_2$, which is slightly greater than the pressure $P_1$. The safety device according to the invention also comprises pressurization and depressurization means for the lower compartment and is characterized in that these means comprise at least one gate valve opening into a cylindrical body inside which is displaced a piston provided with a central orifice opening into a hollow rod integral with the piston. The semispherical lower end of this rod engages in a lower position with a junction element situated at the top of a vertical pipe crossing the upper compartment of the reservoir to connect the lower compartment with the outside.

When the cylindrical body is put under pressure, the lower end of the hollow rod engages with the junction element situated at the top of the vertical pipe crossing the upper compartment of the reservoir thereby making it possible to put under pressure the lower compartment and to send the liquid absorbent into the upper compartment.

The gas pressure in the lower compartment is then equal to the pressure prevailing in the upper compartment increased by the pressure exerted by the column of liquid.

When the pressure of the gas in the cylindrical body is sharply reduced, the piston rises and the hollow rod is disconnected from the top of the vertical pipe. The gas then escapes from the lower compartment so that the liquid absorbent is ejected at great speed into the latter under the effect of the pressure prevailing in the upper compartment.

All that is required to recommission the safety rod according to the invention is the repressurization of the cylindrical body.

According to an important feature of the invention, the means for pressurizing and depressurizing the lower compartment comprise only two gate valves: One low duty three-way valve permitting slow introduction and withdrawal movements of the liquid absorbent when the hollow rod is connected to the top of the vertical pipe, and one rapid opening valve permitting the disconnection of the hollow rod and the rapid introduction of the liquid absorbent.

The circuits outside the reactor are thus only non-active, non-dangerous, pneumatic circuits, which are not particularly large.

According to another feature of the invention, the reservoir is diametrically small in size and may be contained in a casing identical in size to those used for the fuel. This considerably facilitates handling operations.

Other objects, features and advantages of the present invention will be made apparent from the following detailed description of the preferred embodiment thereof provided by way of a non-limitative example with reference to the accompanying drawings, in which:

BRIEF DESCRIPTION OF THE DRAWINGS

FIG. 2b is a horizontal half section AA of the safety rod,

DESCRIPTION OF THE PREFERRED EMBODIMENTS

Figure 1:
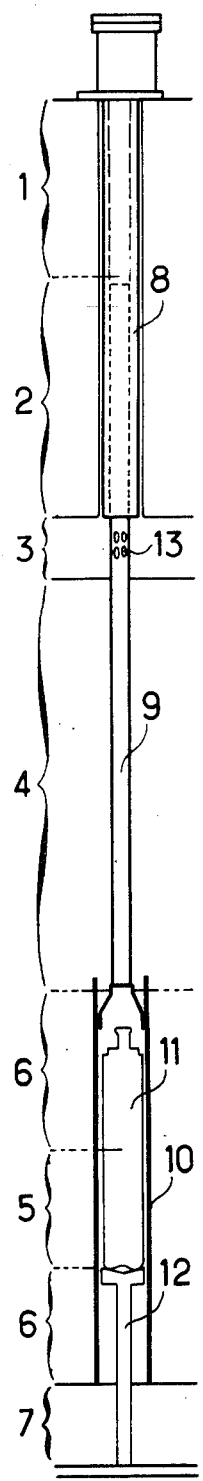
FIG. 1 is a diagrammatic view of a rapid nuclear reactor in which is disposed the safety rod according to the invention.

The rapid reactor represented in FIG. 1 comprises within a casing or vessel C, a portion of which is shown in FIG. 1, from top to bottom, a cover 1 surmounting a protective plug 2, a gas layer 3 (for example, argon or helium), a sodium layer 4, the core 5 containing the fuel surrounded by a space 6 without the core and finally the support 7.

Each safety rod comprises a cylindrical body 8 extending from the top of the cover 1 to the bottom of the plug 2, a mobile shaft 9, the upper part of which slides into the cylindrical body 8, and the lower part of which is funnel-shaped and is situated below the extra-core space/sodium layer limit.

This lower part (see FIG. 2) is vertically mobile inside a casing 10, inside which is a reservoir 11 disposed on a pedestal 12 situated just below the core 5.

There are openings 13 in the shaft 9 at the level of the gas layer 3.

Figure 2A:
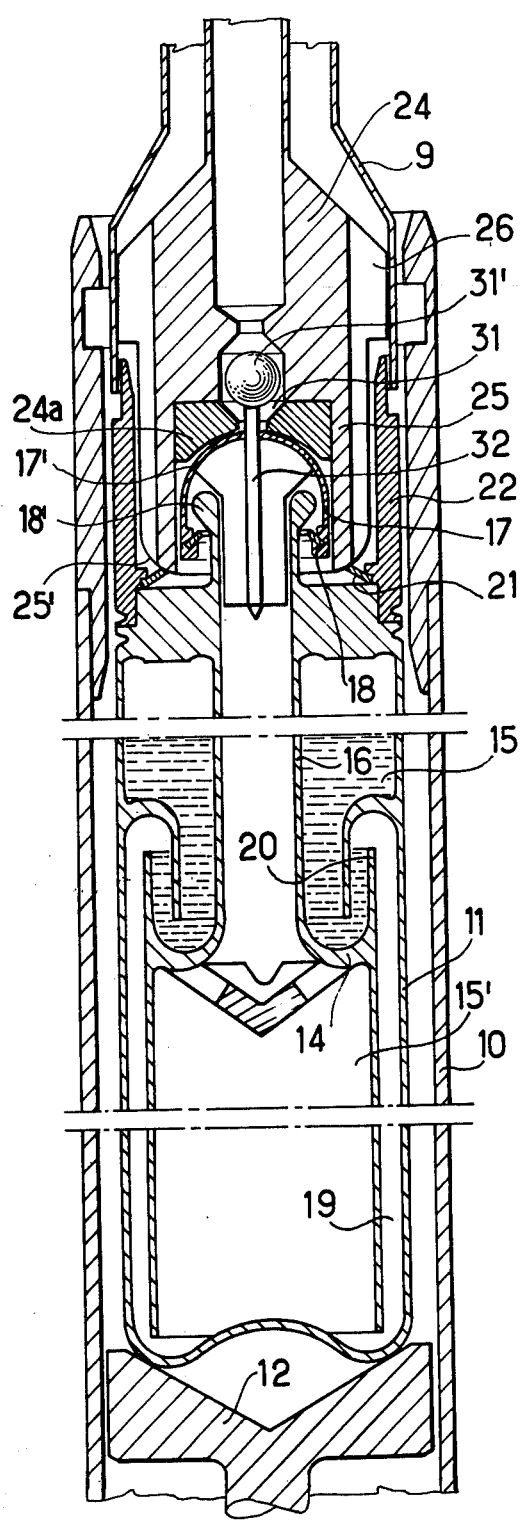
FIG. 2a shows a vertical sectional view of the part of the safety rod situated in the core and in the space outside the core of the reactor, FIG. 2a' is a vertical sectional view identical to that of FIG. 2a with components in a different control state.
Figure 2A:
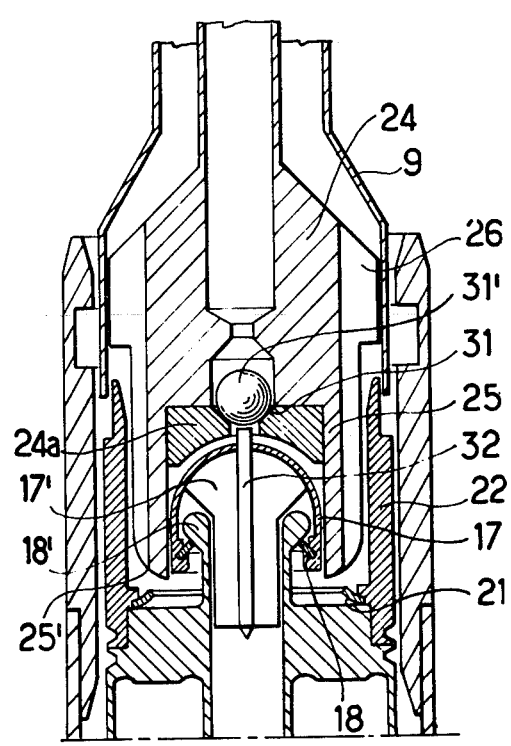
Figure 4:
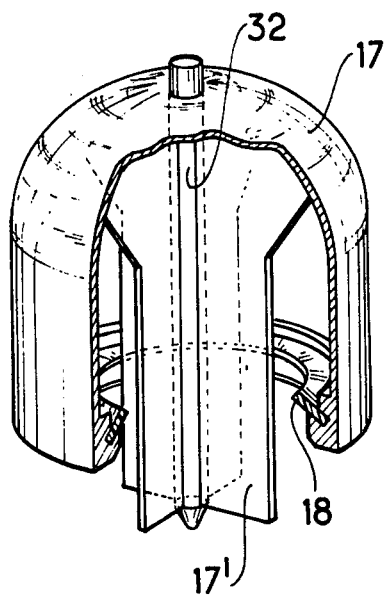
FIG. 4 is a perspective cut away view of the bell and teat shown in FIGS. 2a and 2a'.

With reference to FIG. 2a, which shows the part of the safety rod at the level of the extra-core space and of the core, it will be noted that the reservoir 11 is situated in the casing 10 resting on the pedestal 12.

The reservoir 11 is cylindrical in shape and is divided approximately in its center by a partition 14 defining an upper compartment 15 situated in the extra-core space of the reactor and a lower compartment 15' situated in the core.

The lower compartment 15' communicates with the outside of the reservoir 11 via a vertical pipe 16 entirely crossing the upper compartment 15 and is provided at its upper part with a mobile bell 17 vertically provided with a dish-shaped seal 18 capable of sealing the pipe 16 in the upper position. Seal 18 is supported by bell 17 and movable therewith to contact the radially enlarged end 18' of pipe 16.

The two compartments 15 and 15' communicate via an annular conduit 19 commencing at the base of the lower compartment 15' and opening into the upper compartment 15 at the level of the partition 14 by way of a siphon device 20.

The upper part of the reservoir 11 is provided with a conical dish seal 21, which is held in place by a cylindrical part 22 by pressing the outer periphery of seal 21 against the top of reservoir 11.

FIG. 2b, which is a horizontal half-sectional view of the safety rod, shows successively the hexagonal casing 10, the reservoir 11, the wall defining the annular conduit 19, the wall of the siphon 20 and the vertical pipe 16.

Figure 3:
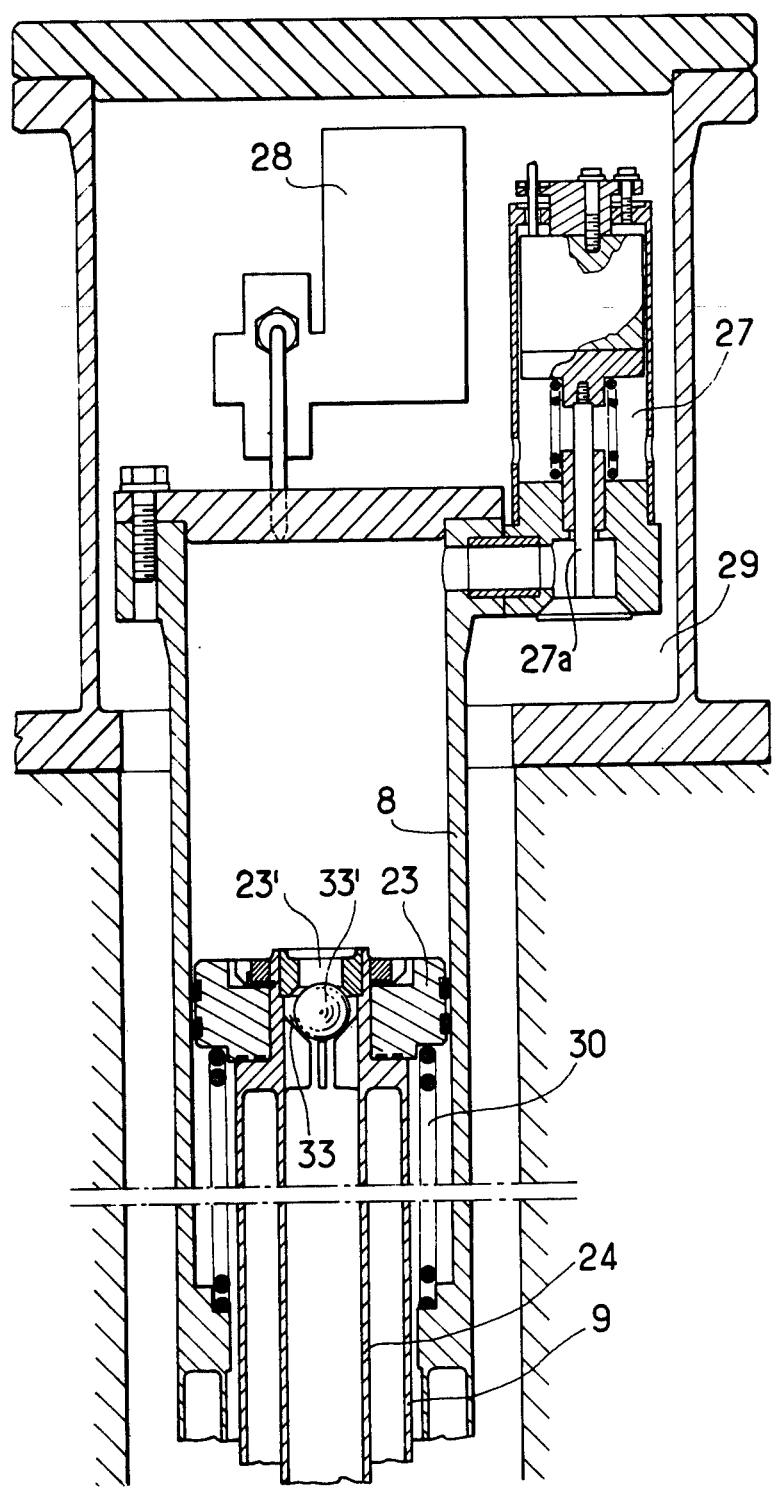
FIG. 3 shows the part of the safety rod situated at the level of the reactor cover.

FIG. 3, which represents the part of the safety rod situated at the level of the cover and the protective plug of the reactor, shows the cylindrical body 8 lodged in holes provided in the protective plug.

A piston 23 integral with the shaft 9 and with a hollow rod 24 situated inside the shaft 9 and having the same axis, is displaced inside the cylindrical body 8. The piston 23 comprises in its center an orifice 23' permitting communication between the upper part of the cylindrical body 8 and the hollow rod 24.

The lower end 25 (see FIG. 2a) of the rod 24 carries rod 24a which is a spherical bottom surface and bears fins 26 rendering it integral with the shaft 9. In the lower position, this end 25 comes to rest against dish seal 21 of the reservoir 11 while the lower part of the shaft 9 surrounds the upper part of the cylindrical part 22.

The top part of the cylindrical body 8 comprises a heavy-duty rapid opening electro-valve 27 and a low-duty normal opening three-way electro-valve 28. Electro-valve 27 includes a spring biased normally closed valve member 27a. The exhausting of these two valves takes place in the container 29, which communicates with the space containing the cover gas 3 by way of an annular space surrounding the cylindrical body (see FIG. 1).

In the rest position, the piston 23 and the hollow rod 24 and the shaft 9 are kept in the upper position by a spring 30, owing to the absence of pressure in the cylindrical body 8.

The hollow rod 24 bears a ball valve 31 at its lower end. This ball valve allows the passage of gas in the raised position of the ball 31'. This valve permits the maintaining of pressure to obtain displacement of the piston up to the moment of connecting with the reservoir 11. A few millimeters before this connection is made, the ball 31' of the valve 31 is raised by a vertical, teat 32 extending beyond the bell 17. Vertical teat 32 is carried by support member 17' within pipe 16 without blocking flow around end 18' of pipe 16. Bell 17 is apertured at 17a to slide on teat 32.

Another ball valve 33 is located at the upper part of the hollow rod 24 and seals the orifice 23' of the piston 23 when the ball 33' of the valve 33 is in the raised position. The role of the valve 33 is to prevent the relaxation of the gas contained in the space between the two valves. In fact, the volume of this space is much greater than the volume of the cylindrical body 8 situated above the piston 23. The relaxation of the gas contained in the space between the two valves would considerably increase the operating time of the safety rod.

The safety rod according to the invention operates as follows:

When the reservoir 11 is in position on the pedestal 12 and its lower compartment 15' is filled (by means not shown) with liquid absorbent A, for example, lithium 6, the space within the cylindrical body 8 situated above the piston 23, is pressurized by way of the three-way electro-valve 28. The ball valve 31 closes and the piston 23 descends. As soon as the lower end 25 of the hollow rod 24 arrives near the top of the reservoir, the teat 32 of the bell 17 opens the ball valve 31 so that first the sodium in the vicinity of end 25 due to sodium level 4 is driven by the gas under pressure issuing from the valve 31 into the passage between hollow rod 24 and shaft 9. The bell 17 is pushed downwards by the end 25 of the hollow rod until the edges of this end come to rest against the dish seal 21. The gas under pressure FIG. 2a then penetrates the lower compartment 15' of the reservoir 11' by flowing down and over bell 17, between dish-shaped sealing joint 18 and pipe 16 inside bell 17 over end 18' of pipe 16 and down inside pipe 16 driving the liquid absorbent into the upper compartment 15.

When the level of the liquid in the lower compartment 15' reaches the level of the lower end of the annular conduit 19, the gas penetrates in turn into the conduit so that the pressure $P_1$ in the upper compartment 15 is equal to the pressure $P_2$ in the lower compartment at the static pressure corresponding to the liquid levels in the two compartments.

When all the liquid absorbent A has passed into the upper compartment 15', FIG. 2a and the pressure in the lower compartment is appreciably higher than the pressure in the core of the reactor, the injection of gas under pressure into the lower compartment 15 ceases by putting the three-way electro-valve 28 into the closed position.

When the rapid electro-valve 27 is opened for safety operation, the pressure in the cylindrical body 8 is counterbalanced and the ball valve 33 closes. The combined action of the spring 30 and the undertow effect on the spherical end 25 of the hollow rod 24 causes the piston 23 and the hollow rod 24 to rise, while the ball valve 31 closes on its seat formed by member 24a, imprisoning the gas contained between the two valves in the hollow rod 24. Raising rod 24 causes seat 24a to lift ball 31' slightly off teat 32, FIG. 2a', to close valve 31. As rod 24 rises, gas escapes from lower compartment 15', through pipe 16 around pipe end 18', past open seal 18.

The gas escapes from the lower compartment 15' an liquid absorbent is driven towards the same by the pressure in the upper compartment 15. The gas escapes between the spherical end 25 and the conical dish seal 21, and rises at the surface of the sodium contained in the annular conduit situated between the rod 24 and the shaft 9. This gas then passes via the holes 13 in the shaft 9 into the space 3 containing the cover gas.

The passage of the liquid absorbent from the upper compartment 15' to the lower compartment 15 is practically instantaneous as soon as the seal-tightness of the conical dish seal 21 is terminated.

Under the effect of the gas pressure still prevailing in the lower compartment 15', the bell 17 adopts an upper position and the seal joint 18 is applied against the end 18 of the vertical pipe 16 preventing the sodium from re-entering the reservoir 11 as dish seal 21 remains out of contact with end 25' of hollow rod 24, FIG. 2a'.

The reactivity of the reactor can be sharply reduced by the rapid introduction of the liquid absorbent into the core of the reactor.

The operating cycle can be recommenced and the safety rod brought back into commission by repressurizing the cylindrical body and passing the liquid absorbent back from the lower compartment to the upper compartment.

It is always possible to raise and lower the liquid slowly by means of the three-way electro-valve 28. In this event, as long as the seal-tightness at the level of the conical dish seal 21, is not broken slow increase and decrease of gas pressure within lower compartment 15' slowly varies the amount of absorbent passed to and from that compartment.

The safety rod according to the invention may thus be used both as a rapid acting safety rod and a guide or control rod. Its application is not limited to rapid reactors and it may be employed in all rapid or slow reactors by using the appropriate liquid absorbent to rapidly reduce or gradually vary the reactivity of the reactor.

Although the safety rod described is most advantageous when used in the embodiment according to the invention, it can obviously be modified in various ways without departing from the scope of the invention and certain elements contained therein can be replaced by others capable of ensuring the same technical function or an equivalent technical function.

What is claimed is:

1. In combination, an insertable safety control and shut down assembly and a fast nuclear power reactor, said reactor having a reactor core, a cover overlying said reactor core, aligned vertical cylindrical openings within said cover and said core, said assembly comprising:
   a cylindrical casing having the size of a fuel cell and mounted within a reactor core cylindrical opening,
   a cylindrical body within an aligned cylindrical opening of said cover,
   a hollow rod surmounting said cylindrical casing and bearing at its upper portion a piston slidably mounted within said cylindrical body,
   said cylindrical body being closed off at its upper end by valve means,
   said cylindrical casing comprising a reservoir divided into fluid communicating upper and lower superposed compartments with the upper compartment above the core and the lower compartment within the core,
   liquid abosrbent within said reservoir and movable by gravity into said lower compartment,
   means including said valve means, said piston and said slidable hollow rod for supplying gas under pressure to said lower compartment to force the liquid absorbent to move into the upper compartment, said means including an axial pipe extending from said lower compartment through said upper compartment, and a junction element borne at the upper end of said pipe and engagable with the slidable hollow rod when the hollow rod is lowered by gas pressure applied to the piston when said valve means is open to seal off fluid communication by way of said junction element between said axial pipe and the exterior of said slidable hollow rod.

2. The combination according to claim 1, wherein the top of said vertical cylindrical casing comprises an annular seal against which the periphery of the end of the hollow rod abuts.

3. The combination according to claim 1, wherein said valve means comprises a three-way valve for the slow introduction of gas under pressure into the lower compartment and for the slow withdrawal therefrom to cause liquid absorbent to move slowly to and from said upper compartment, and a rapid opening valve for rapid release of gas pressure from said lower compartment and the rapid introduction of liquid absorbent from said upper compartment into said lower compartment.

4. The combination according to claim 1, wherein said junction element connecting the lower compartment to the exterior of the hollow rod through said axial pipe comprises a bell, and a dish-shaped annular seal which extends radially inward from the inner periphery of said bell and which, in the raised position of the bell, abuts against the outer periphery of said axial pipe at the upper end thereof.

5. The combination according to claim 4, wherein said hollow rod is enclosed by a hollow shaft coaxial with said rod and being integral with said piston, and means carried by said shaft which permits the gas escaping from the lower compartment of the reservoir through said axial pipe and said junction element, to escape upwardly between said hollow rod and said shaft and wherein said reactor includes a gas layer beneath said cover and wherein said means carried by said shaft comprises openings therein at the level of said gas layer.

6. The combination according to claim 1, wherein said piston is provided with a central orifice, and said orifice is provided with a ball valve movable axially of said hollow rod away from said orifice and towards said cylindrical casing to permit gas under pressure to pass therethrough, but moves axially away from said cylindrical casing to close off the fluid passage through the hollow rod from said piston to said junction element when said valve means is closed.

7. The combination according to claim 2, wherein the junction element with the vertical pipe connecting the lower compartment with the outside is a bell having the same axis as the pipe and being mobile along this axis, the edge of said bell being provided with a dish-shaped seal, which, in the raised position of the bell, abuts against the outer periphery of the top of the pipe.

8. The combination according to claim 7, wherein the lower end of the hollow rod is provided with a ball valve which allows the passage of the gas from the hollow rod to the axial pipe when the ball is in a raised position relative to its valve seat.

9. The combination according to claim 8, wherein said bell is provided with a vertical teat which extends upwardly within said hollow rod and contacts said ball for relative raising of the ball and opening of the ball valve when the piston is displaced downwardly in response to application of gas pressure through said valve means against said piston to move said mobile shaft axially towards said cylindrical casing.

10. The combination according to claim 8, wherein the bell is provided with a vertical teat for relatively raising the ball of the valve off its valve seat in the lowered position of the piston.

* * * * *